US011312278B2

(12) United States Patent
Mazzucchelli

(10) Patent No.: US 11,312,278 B2
(45) Date of Patent: Apr. 26, 2022

(54) SUPPORT DEVICE WITH ADJUSTMENT OF THE SHAPE

(71) Applicants: Advance Kites S.r.L., Sale Marasino (IT); Toscana Gomma S.p.A., Robbio (IT)

(72) Inventor: Alessandro Mazzucchelli, Sale Marasino (IT)

(73) Assignee: TOSCANA GOMMA S.P.A., Robbio (IT)

( * ) Notice: Subject to any disclaimer, the term of this patent is extended or adjusted under 35 U.S.C. 154(b) by 0 days.

(21) Appl. No.: 16/640,510

(22) PCT Filed: Jun. 4, 2018

(86) PCT No.: PCT/IB2018/053984
§ 371 (c)(1),
(2) Date: Feb. 20, 2020

(87) PCT Pub. No.: WO2019/025877
PCT Pub. Date: Feb. 7, 2019

(65) Prior Publication Data
US 2020/0238874 A1 Jul. 30, 2020

(30) Foreign Application Priority Data
Aug. 4, 2017 (IT) .................. 102017000090311

(51) Int. Cl.
*B60N 2/90* (2018.01)
*B60N 2/66* (2006.01)
*B60N 2/853* (2018.01)
*B60N 2/22* (2006.01)
*B60N 2/64* (2006.01)

(52) U.S. Cl.
CPC ............. *B60N 2/914* (2018.02); *B60N 2/665* (2015.04); *B60N 2/22* (2013.01); *B60N 2/643* (2013.01); *B60N 2/853* (2018.02); *B60N 2/99* (2018.02)

(58) Field of Classification Search
CPC ................................ B60N 2/914; B60N 2/665
See application file for complete search history.

(56) References Cited

U.S. PATENT DOCUMENTS

| | | | | |
|---|---|---|---|---|
| 4,371,997 A | * | 2/1983 | Mattson ............... | A47C 27/081 297/DIG. 3 |
| 4,890,885 A | * | 1/1990 | Grossmann .......... | A47C 27/086 297/284.1 |
| 5,033,133 A | * | 7/1991 | Nissen ................. | A47C 27/088 5/653 |
| 5,660,438 A | * | 8/1997 | Tedesco ................ | A47C 7/467 297/284.1 |

(Continued)

FOREIGN PATENT DOCUMENTS

| | | | | |
|---|---|---|---|---|
| GB | 2232078 A | * | 12/1990 | ............. B60N 2/914 |
| WO | WO-2015104676 A1 | * | 7/2015 | ............... B60N 2/70 |

*Primary Examiner* — Timothy J Brindley
(74) *Attorney, Agent, or Firm* — Vorys, Sater, Seymour and Pease LLP

(57) ABSTRACT

Provided is a support device including a flexible air-tight membrane, defining an internal volume and including a connection valve configured to allow introduction or extraction of air into/from the internal volume, and a compressible solid body housed in the internal volume and made of a material which, when said membrane is placed under vacuum, has a volume that decreases by at least 5%.

19 Claims, 5 Drawing Sheets

(56) References Cited

U.S. PATENT DOCUMENTS

| | | | |
|---|---|---|---|
| 6,684,433 B2* | 2/2004 | Giori | A47C 27/081 5/709 |
| 9,345,335 B2* | 5/2016 | Giori | A47C 27/088 |
| 2006/0108853 A1* | 5/2006 | Embach | B60N 2/914 297/452.41 |

* cited by examiner

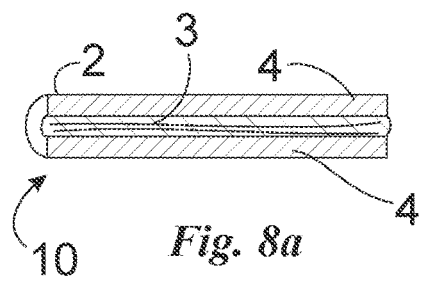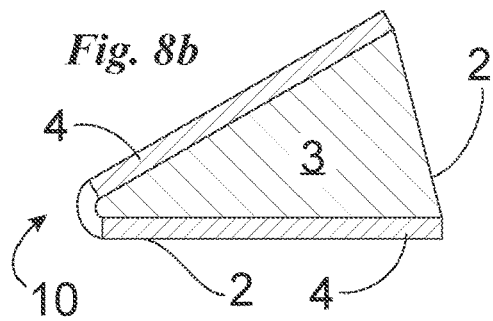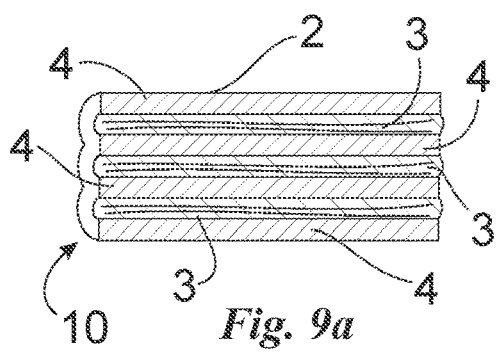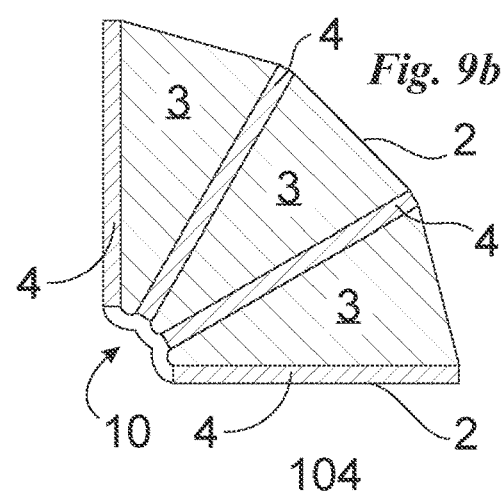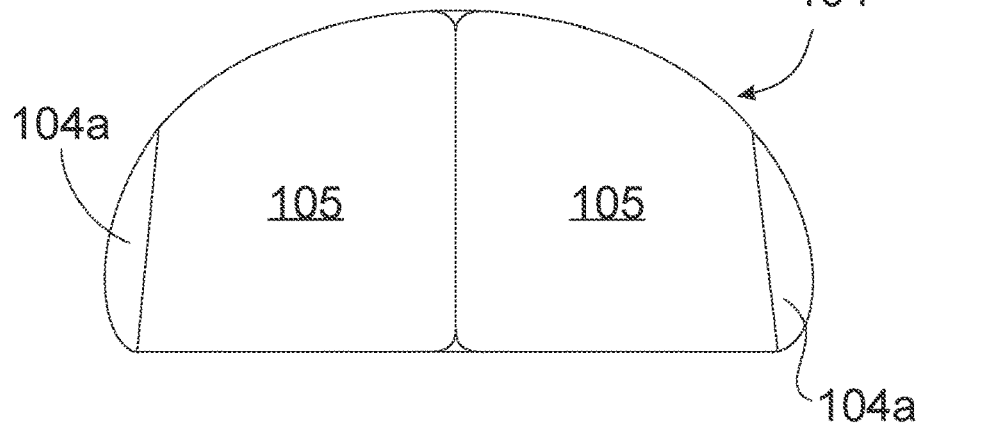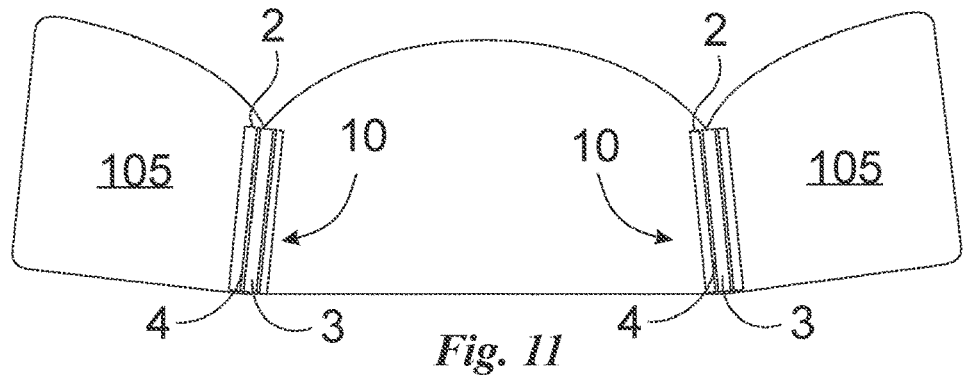

SUPPORT DEVICE WITH ADJUSTMENT OF THE SHAPE

The present invention relates to a support device, of the type described in the preamble of the first Claim.

Various types of support devices are currently known, such as vehicle seats, devices such as seat belts and similar for parts of the body, body backpacks, body-borne sports and/or medical equipment, packaging containers and more.

These devices may comprise various measures to improve comfort or to absorb shocks.

For example, seats have cushions and similar means suitable to ensure comfort and, in addition, in order to further improve comfort, the seat may comprise, between the cushion and the cover, one or more inflatable air chambers, known as bladders, suitable of changing the shape of the seat to meet the user's needs.

Bladders are also applicable to other types of seating or various support devices.

The prior art described above has some important drawbacks.

A first important defect is that the support devices are not particularly comfortable due to the inability of the air chambers to adapt to the portion of the body adjacent to them.

In addition, in a partially inflated support, air volumes will move to where there is no load, pressure or contact with the body. In fact, in a zone that is not useful for supporting surfaces or objects.

Indeed, when inflated, air chambers and, consequently, support devices tend to take a roundish form and, therefore, are not able to support properly the body or other objects.

In these circumstances, the technical task underlying the present invention is to devise a support device capable of substantially remedying the said drawbacks.

As part of this technical task, an important object of the invention is to obtain a support device, which is comfortable or appropriate to the shape of the object it covers.

The technical task and the objectives specified are achieved by a support device as claimed in the attached Claim 1.

Preferred embodiments are described in the dependent claims.

The characteristics and benefits of the invention will be clarified in the following detailed descriptions of a preferred embodiment of the invention, with reference to the accompanying drawings, wherein:

FIG. 8a shows depressurised means of movement comprising the support device according to the invention;

FIG. 8b shows the means of movement of FIG. 8a at atmospheric pressure;

FIG. 9a shows depressurised means of movement, comprising the support device according to the invention, in a fan configuration;

FIG. 9b shows the means of movement of FIG. 8a at atmospheric pressure, in a fan configuration;

FIG. 10 shows a headrest comprising the means of movement according to the invention in a closed configuration; and FIG. 11 shows the seat of FIG. 10 in an open configuration.

Figure 1:
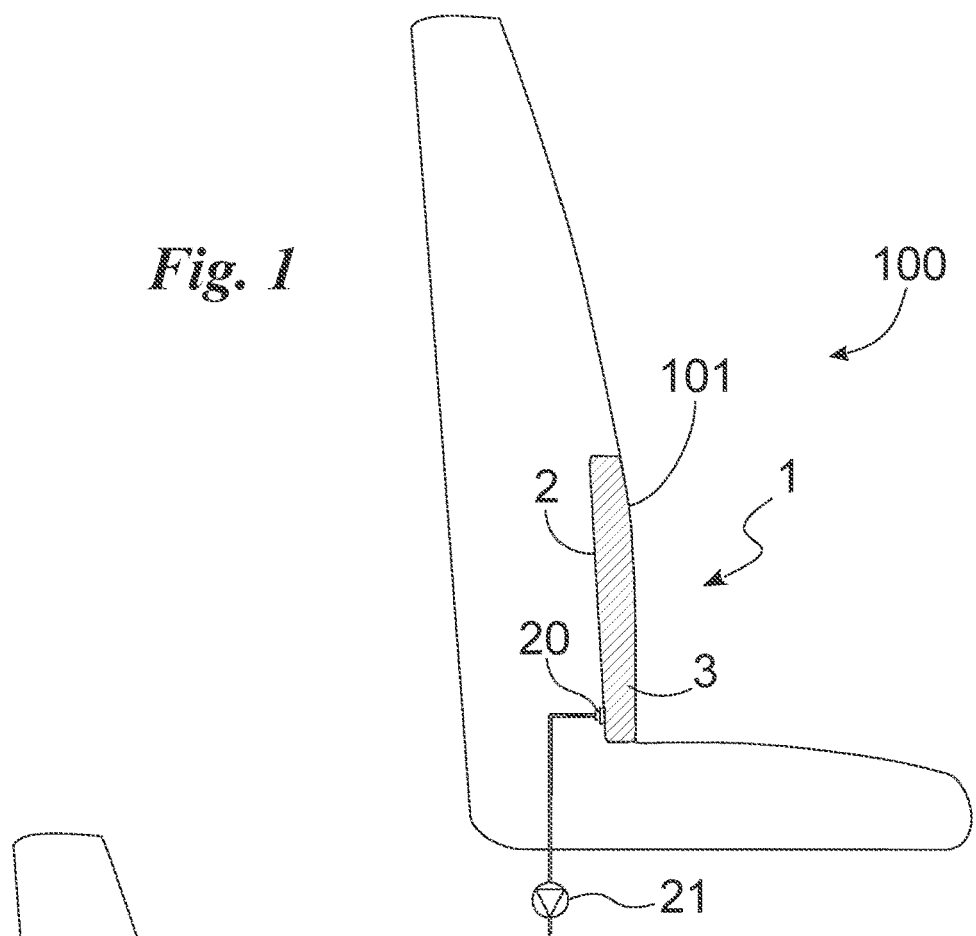
FIG. 1 shows a seat comprising a support device according to the invention in a first configuration.
Figure 2:
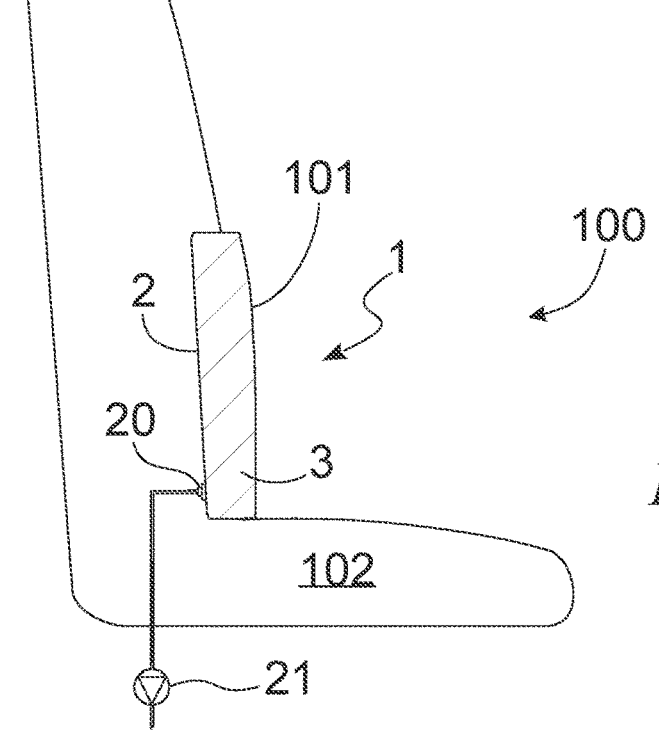
FIG. 2 shows the seat of FIG. 1 in a second configuration.
Figure 3A:
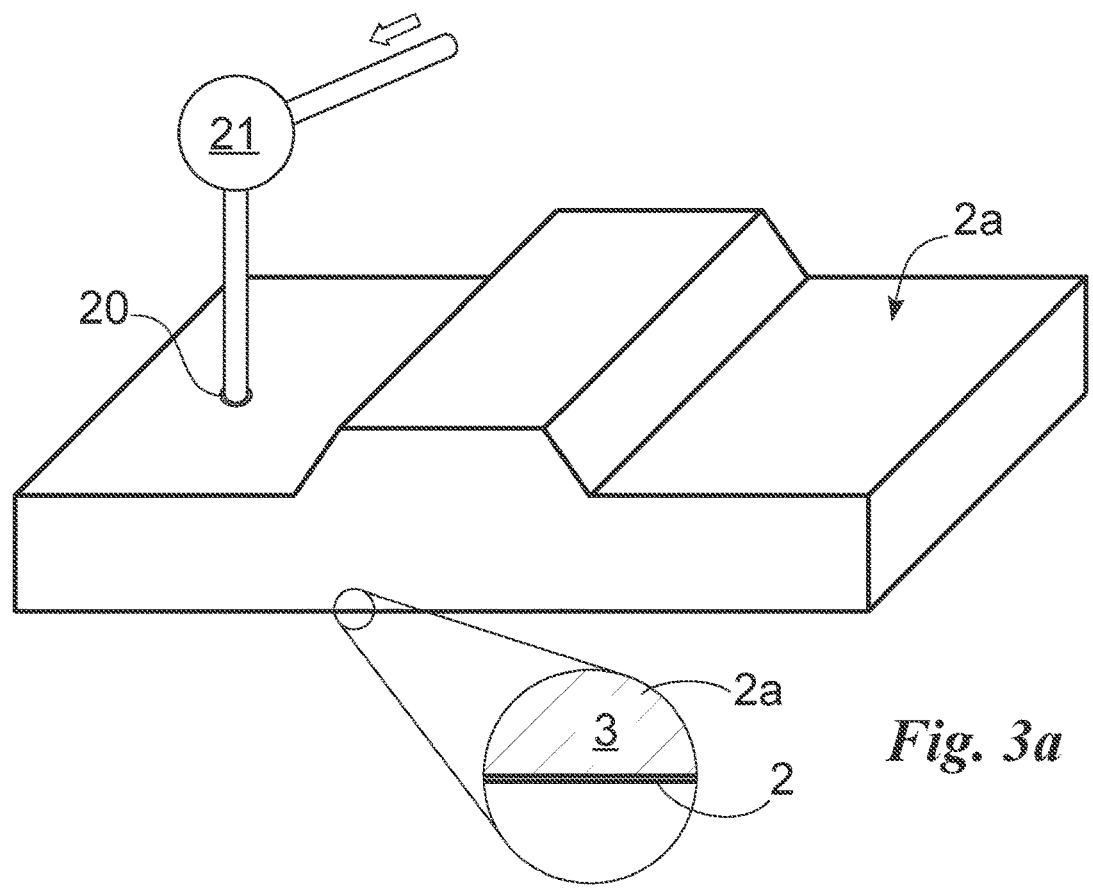
FIG. 3a shows a support device according to the invention in a first configuration.
Figure 3B:
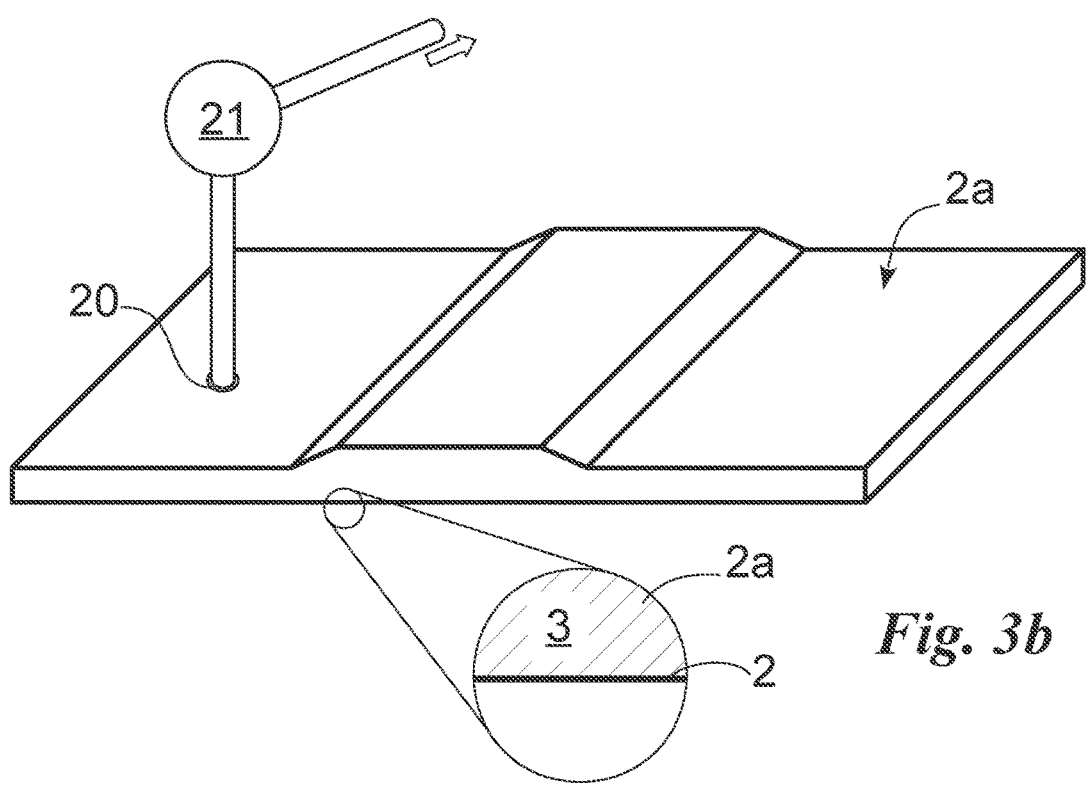
FIG. 3b shows the device of FIG. 1 in a second configuration.
Figure 4:
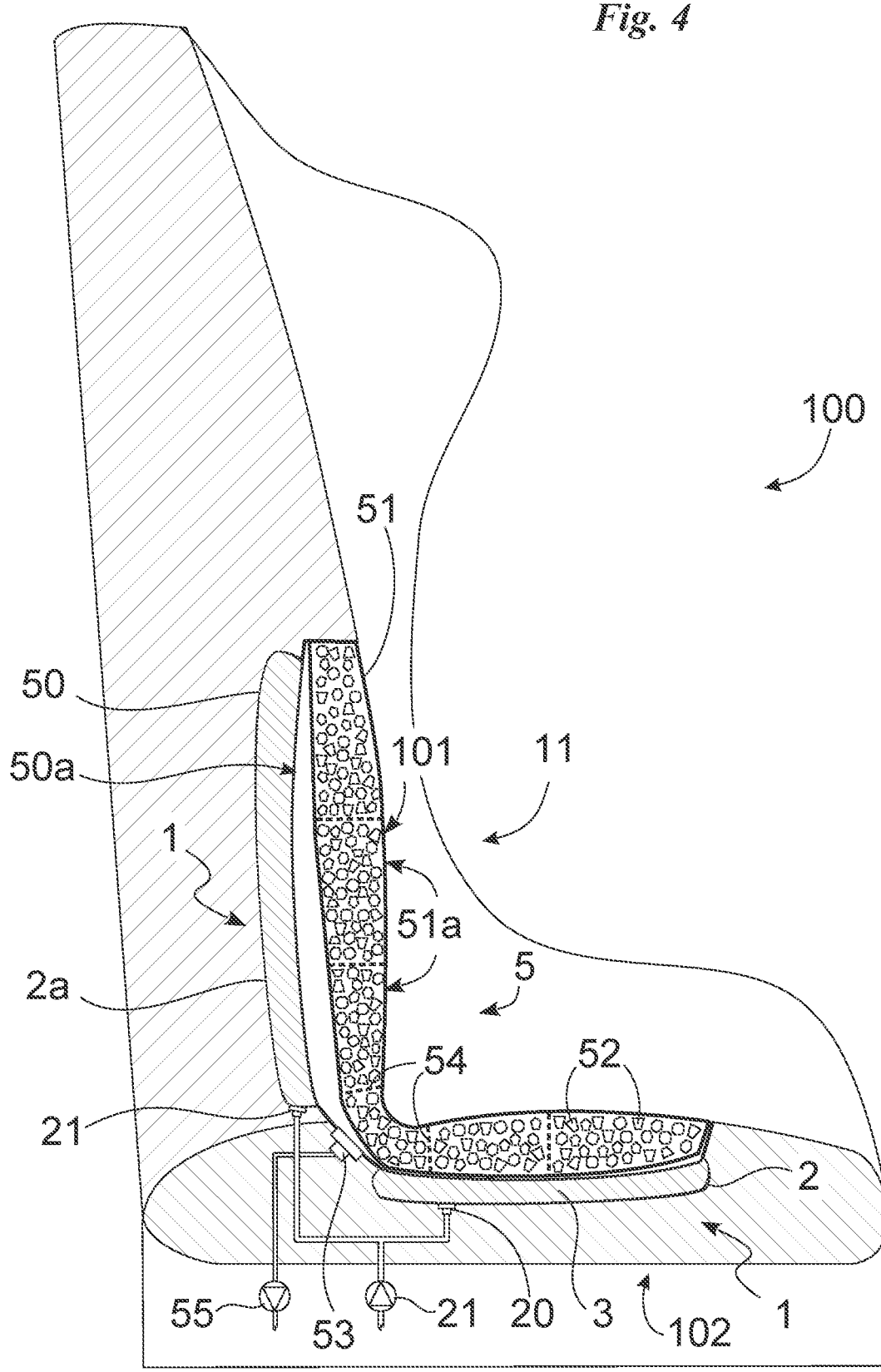
FIG. 4 shows a seat comprising means of control comprising the support device according to the invention and a vacuum device.

In this document, measurements, values, shapes and geometric references (such as perpendicularity and parallelism), when associated with words such as "approximately" or other similar terms such as "nearly" or "substantially", are to be understood as less than measurement errors or inaccuracies due to manufacturing and/or manufacturing errors and, above all, less than a slight deviation from the associated value, measurement, shape or geometric reference. For example, these terms, when associated with a value, preferably indicate a divergence not exceeding 10% of the value.

Further, when used, terms such as "first", "second", "top", "bottom", "main" and "secondary" do not necessarily identify an order, a priority of relation or relative position, but can simply be used to more clearly distinguish between different components.

The measurements and data reported in this text are to be considered, unless otherwise indicated, as carried out in the ICAO International Standard Atmosphere (ISO 2533).

With reference to the Figures, the support device according to the invention is indicated in its totality with the number 1.

It is suitable to support and/or protect an object, such as a portion of the human body or a device or other. The support device 1 can thus be integrated into: a seat, for example for a car or other, a physical activity belt, hospital equipment in contact with the body, part of beds or stretchers, a container for objects, a harness for sports activities and more.

The support device 1 comprises: a flexible air-tight membrane 2, defining an internal volume 2a and comprising a connection valve 20 suitable to allow introduction or extraction of air into/from the internal volume 2a and a compressible solid body 3 housed in the internal volume 2a. The membrane 2 can be glued or integral to the solid body 3 or separate from it.

In more detail, the air-tight membrane 2 is preferably made from a continuous polymer material or a fabric impregnated with a polymer material, which makes it airtight.

It forms an internal volume 2a, closed by said membrane 2 and comprises at least one valve 20, which can be of the one-way or two-way type. The valve 20 can be opened or closed on command, using known means of control, to allow air to enter or to exit to the external environment.

Together with the valve 20, the support device 1 preferably comprises a vacuum pump 21, preferably of the electrical type, or of the manual or other type. It is preferably suitable to substantially reduce the vacuum inside the membrane 2, i.e. to ensure that the internal volume 20 is substantially zero.

The compressible solid body 3 is preferably made from a material, or materials, which, when the membrane 2 is placed under vacuum, has a volume, which is reduced by at least 5%. More preferably, the said volume reduces by more than 10%, more preferably still, by more than 20%, more preferably still, by more than 30%, more preferably still, by more than 40%, more preferably still, by more than 50%, and more preferably still by more than 60%.

Said compressible solid body 3 therefore has a coefficient of compressibility $\beta$, according to the well-known formula $\beta=-\partial V/(V\ \partial p)$, preferably greater than 0.5 $GPa^{-1}$, more preferably greater than 1 $GPa^{-1}$, more; preferably greater than 2 $GPa^{-1}$, more preferably greater than 3 $GPa^{-1}$, more preferably greater than 4 $GPa^{-1}$, more preferably greater than 2 $GPa^{-1}$, more preferably greater than 5 $GPa^{-1}$, more preferably greater than 6 $GPa^{-1}$.

The compressible solid body 3 preferably comprises, or is made of, polymeric foam, preferably a polyurethane foam, which is preferably open-celled and preferably very expanded. For example, there are similar known materials such as foam rubber. Other similar materials are known by the common name sponge.

The air-tight membrane 2 and the compressible solid body 3 thus define a bladder, which however, in its maximum position of extension, appropriately maintains the shape of the compressible solid body 3 which can be arbitrary and not limited to the roundish and spherical shapes of known bladders.

The compressible body 3, as an alternative or in addition to the pump 21, can also be compressed exclusively by external forces such as the weight of the human body or objects. In this case, the valves 20 are preferably one-way and can be switched on or off, while the pumps 21 may be absent.

In other words, the air-tight membrane 2 and the compressible solid body 3 are exclusively designed to allow for expansion or shrinkage of the internal volume 2a to the maximum volume defined by the compressible solid body 3. The air-tight membrane 2 is not allowed to swell further since, in detail, the device 1 is preferably subjected to maximum pressures equal to atmospheric pressure. In particular, the said compressible solid body 3 is exclusively used at volumes equal to or less than the volume of said compressible solid body 3 at ambient pressure.

Therefore, the device 1 preferably comprises only means of extracting air from the compressible solid body 3, such as in particular the vacuum pump 21, and does not comprise an air-inlet pump in the body 3, since atmospheric pressure by itself is sufficient to introduce the air.

The membrane 2 thus defines a configuration of minimum extension and one of maximum extension. In the configuration of minimum extension there is essentially no gas inside the membrane 2 and the atmospheric pressure compresses, with a pressure of approximately 1 bar, the compressible solid body 3, maximally reducing its volume. In the maximum extension configuration the compressible solid body 3 is preferably not substantially compressed by the membrane 2, which, preferably, precisely surrounds said compressible solid body 3, substantially adhering to it. In this configuration, the pressure inside the membrane 2 is preferably the ambient pressure, alternatively the membrane 2 could define an internal volume 2a larger than the volume of the compressible solid body 3, and the configuration of maximum extension could still provide a slight vacuum (e.g. 0.1-0.2 bar) which makes it possible to substantially maintain the shape of the compressible solid body 3.

In addition what is described above, the device 1 further preferably comprises a support portion 4, preferably inside the membrane 2.

The support portion 4 is preferably substantially rigid or non-deformable. In addition, it is preferably stiffer than the compressible solid body 3. In detail, the support portion 4 is sufficiently rigid, with respect to the pressures involved in the operation of the device 1, so as not to be substantially deformed in any configuration.

The support portion 4 may be firmly attached to a part of the compressible solid body 3, preferably along a support surface 4a. This attachment is preferably obtained by gluing.

For example, a substantially undeformed support portion 4 may be considered to be substantially undeformed if its volume does not deform by more than 5% of the initial undeformed volume as a result of the pressure gradients imposed.

The support portion 4 is, further, preferably positioned adjacent to the part of the membrane 2 comprising the valve 20 in such a way as to allow the valve 20 to be in fluid passage connection with the internal volume 2a via the support portion 4.

In addition, preferably, the support portion 4 is preferably breathable. For example, this support portion may be made of a material such as a non-woven fabric, preferably with a thickness of more than 1 mm, or of a net made of a rigid material, of polymeric or metallic material or of other materials that allow the above-mentioned characteristics to be obtained.

The support portion 4 is substantially suitable for controlling the deformation of the device 1. In fact, when the vacuum pump 21 achieves a vacuum within the internal volume 2a by means of the valve 2, the support portion 4, and the portion of the compressible solid body 3 directly connected to the latter, it keeps its shape while the compressible solid body 3 is compressed.

Figure 6A:
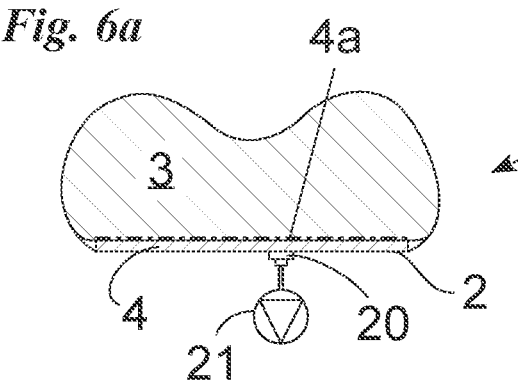
FIG. 6a shows a support device according to the invention comprising a support portion at atmospheric pressure.
Figure 6B:
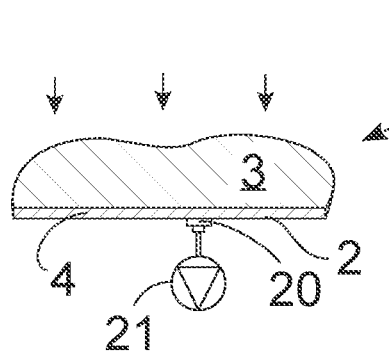
FIG. 6b shows the device of FIG. 6a depressurised in a directional manner.

In addition, in detail, the compressible solid body 3 is compressed towards the support portion 4, preferably in the area of the valve 20. Therefore, the support portion 4 defines a privileged direction of compression, perpendicular to the support surface 4a (FIG. 6b).

In relation to the shape and extension of the support portion 4, it is possible to control the deformations to which the device 1 is subjected.

This benefit makes it possible to create the means of movement 10.

The means of movement 10 can be, for example, of the type shown in FIGS. 7-9b.

For example, one of the means of movement 10 may comprise a device 1, which in turn comprises two support portions 4.

These support portions 4 may be arranged in a mirror-like manner and divided by the compressible solid body 3 in such a way as to create a substantially sandwich structure. In addition, one of the two support portions 4 can be positioned in the area of the valve 20.

In this configuration, preferably, when a vacuum is created, the support portions 4 approach along the line joining the two portions 4 and create a structure with controlled geometry. Such a solution is preferable, for example, for the lateral areas 103 of a seat 100.

Alternatively, one of the means of movement 10 can be more complex and comprise a plurality of devices 1 so as to allow the movement of the support portions 4 along privileged directions.

For example, the means of movement 10 may comprise a device 1 with an essentially triangular cross-sectional geometry.

In this way, if the support portions 4 are arranged along two adjacent sides of the triangle and the support portions 4 are constrained in a labile way, so as to allow only reciprocal rotation between the support portions 4, it is possible to create means of movement 10 to simulate the behaviour of a common mechanical actuator suitable to allow the rotation of the objects.

Finally, the device 1 is preferably integrated in a seat 100.

The seat 100 can be a seat for a standard production car, or a competition seat 100 or a seat 100 for other types of transport.

In particular, the device 1 is conveniently arranged in the lumbar area 101 of the seat 100, so as to create the desired volume for back support, but could also be positioned in other areas.

Figure 5:
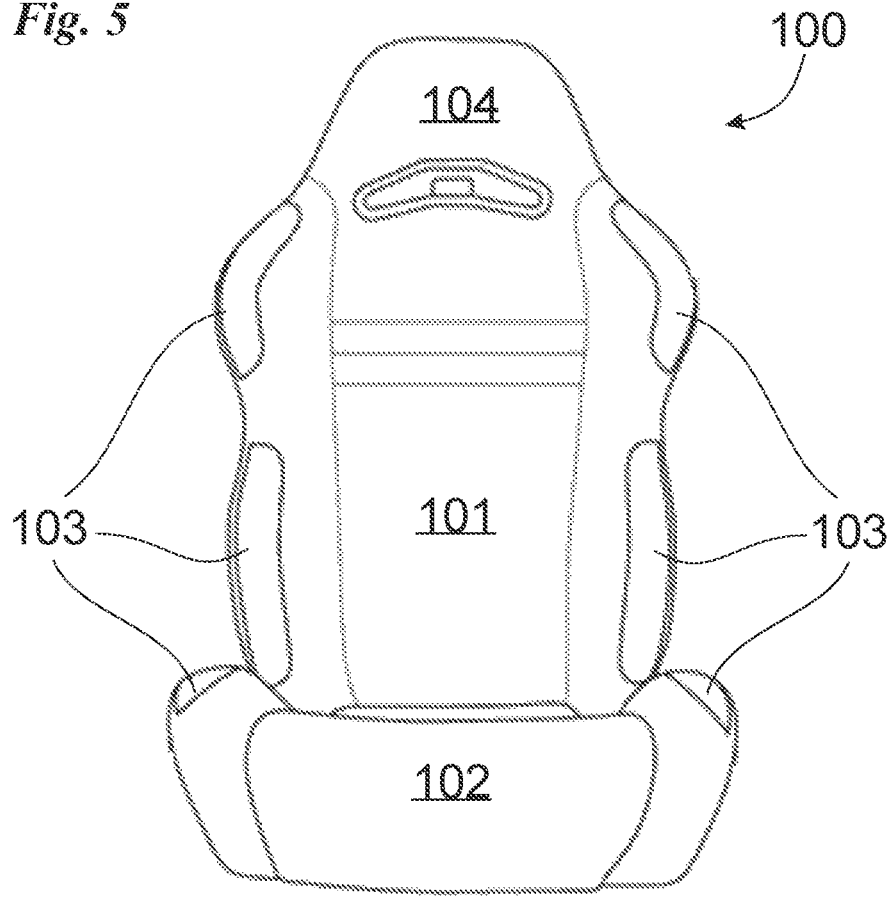
FIG. 5 show a seat wherein areas comprising cushions made with the device according to the invention are highlighted.
Figure 7:
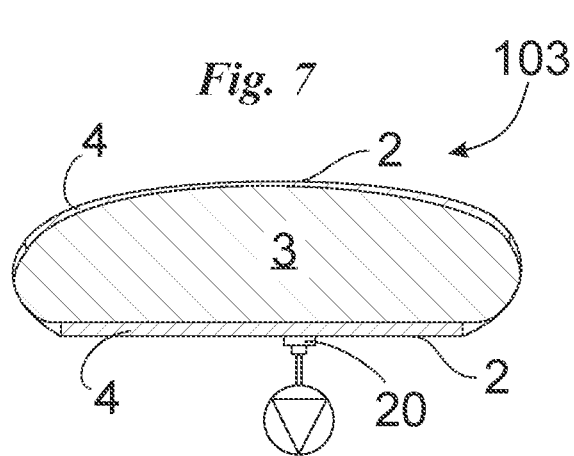
FIG. 7 shows a side cushion of a seat comprising the support device according to the invention defining a sandwich structure.

Appropriately, the device 1 can be integrated into the seat 100 in areas other than the lumbar area 101. For example, the device 1 can be positioned in the seating area 102. In addition, or alternatively, the device 1 can be positioned in the lateral areas 103 of the seating area 102 and/or the lumbar area 101 of the backrest, as shown in FIG. 5.

The device 1, used in a seat, may also be located along the lateral areas 103 or the seating area 102 to adjust to the size of the user.

Therefore, unlike the mechanical devices currently present in seats, the seat side cushions 100 comprising the device 1 according to the invention are suitable to assume, on the user's command, a shape compatible with the shape of the seated user and which is not necessarily pre-determined.

The device 1 can be inserted inside packaging, so as to be able to first insert and then, with the increase in volume, lock in place an object therein inserted.

Each of the means of movement 10 may also comprise a plurality of devices 1 substantially arranged in series in such a way as to allow a fan opening of the means of movement 10, as in FIG. 9b.

These means of movement 10 can be used in one or more parts of the seat 100.

Preferably, the means of movement 10 are used in the area of the headrest 104 of the seat 100.

Appropriately, the headrest 104 comprises two means of movement 10 arranged in a mirror pattern along the sides 104a of the headrest 104 in such a way as to achieve a substantially hinged configuration of the headrest 104.

In detail, the headrest 104 preferably comprises two contact portions 105 subdivided in mirror fashion on the headrest 104, suitable to form the support surface for a user's head, as shown in FIGS. 10 and 11.

These contact portions 105 are preferably removably attached respectively to the rest of the headrest 104 along the sides 104a and 104a by means of their respective means of movement 10.

In this way, when the vacuum pump 21 achieves a vacuum inside the means of movement 10, the headrest assumes a common configuration of the headrest in which the contact portions 105 are attached to it.

When the internal volume 2a of the devices 1 comprised in the means of movement 10 is returned to atmospheric pressure, the contact surfaces open like doors or shutters in a mirror-like manner.

In this configuration, the contact portions 105 are arranged laterally with respect to the headrest 104, and the contact surface available to the user for head support is significantly increased and, substantially, doubled.

A headrest 104 of this type may be designed to increase the comfort of the user in the event that the user desires rest or for other purposes.

A vacuum device 5 can also be coupled to the device 1 according to the invention.

Preferably, the vacuum device 5 is suitable to control the shape of at least part of the device 1 or to make the shape assumed by the device 1 stable in any configuration, especially in the configuration of the device 1 at atmospheric pressure.

The vacuum device 5 comprises a main casing 50 impermeable to the passage of fluid, flexible and defining a secondary volume 50a; an internal casing 51 permeable to the passage of fluid, flexible and positioned inside the main casing 50 so as to delimit at least one portion of the internal volume 50a; a plurality of filling particles 52 housed in the internal casing 51; and a depressurisation valve 53 suitable to establish or terminate a fluid passage connection, preferably for gas (in particular, air), between the main volume 50a and the external environment of the main volume 50a and suitable to allow depressurisation of said volume 50a, defining a decompressed configuration in which the particles 52 are mobile inside the internal casing 51; and a compressed configuration wherein the filling particles 52 are compacted and essentially define at least one solid body 52a.

The vacuum device 5 can further beneficially provide one or more walls 54 which are permeable to the passage of fluid, flexible, and suitable to subdivide the internal casing 51 into a plurality of containers 51a, each of which is suitable to contain filling particles 52. Obviously, the walls 54, subdividing the casing, are suitable to block the passage of filling particles 52 through said walls 54.

The internal casing 51 and the walls 54 are preferably entirely made of the same fluid-permeable and elastic material so that they can change their own extensions without forming ripples during the transition from the decompressed to the compressed configuration.

Finally, the internal casing 51 and the walls 54 are firmly attached together, preferably by gluing. In particular, gluing is possible and appropriate if the walls are made from foam material.

The filling particles 52 may be of various shapes, materials and sizes and may be of different types so as to define a particular physical property of the set of particles, i.e. the solid body 52a, when the device 1 passes into a compressed configuration. In particular, they may be made of the same material and have, for example, dimensions and shapes that may vary from particle to particle or, alternatively, have the same shape and size but may be made of materials which are partially different but with similar mechanical characteristics. As another alternative, the filling particles 52 may be homogeneous, i.e. they all have substantially the same dimensions and shapes, and are made of the same material.

In particular, the particles 52 inside each individual container 51a are homogeneous, while different containers 51a may have different types of particles, so as to create for example a softer surface layer and a firmer inner one.

The particles 52 can be made of one or more of the following materials: polymers such as: PPE (polyphenyl ethers), thermoplastic rubbers or polymers, EPS (expanded polystyrene), TPU (thermoplastic polyurethane) and E-TPU (engineering thermoplastic polyurethane), cork, closed cell polymers, and others.

The main casing 50 is preferably made of a polymer and elastic membrane so as to allow the device 6 to adapt to the shape of the object, such as the portion of body with which the said device is associated. In detail, it is preferably made of TPU film or closed-cell EVA foam, polychloroprene or Neoprene®, polyvinyl chloride or composite materials or other.

In order to change its configuration, the vacuum device 6 preferably comprises a control pump 55 suitable to regulate, via the depressurisation valve 53, the pressure of the main casing 50 and, thus, the pressure inside the internal casing 51 and the containers 51a, controlling the change in configuration of the device 5 and in particular of the filling particles 52.

The control pump 55 and the vacuum pump 21 may also, at least in part, consist of the same device and be suitable to expel air from the main casing 50 and admit it into the internal volume 2a.

The compressible body 3 can also be compressed exclusively by external forces such as the weight of the human body or objects. In this case, the valves 20 are preferably one-way and can be activated or deactivated, while the pumps 21 may be absent.

In particular, the device 1 and the vacuum device 5 together make up the control means 11.

The control means 11 are preferably deformable, expandable, or reducible and are suitable for making contact surfaces, which fit an object such as a user's body.

The control means 11 are preferably arranged in the seating area 102 and the lumbar area 101 of a seat 100.

The vacuum device 5 is preferably arranged between the device 1 and the support surface of the seat 100, therefore the vacuum device 5 covers the contact side between the control means 11 and the surface in contact with the user.

Once the user has settled down on the seat 100, the control means 11 make it possible to configure the seating area 101 and the lumbar area 102 in a highly personalised manner.

In order to achieve this, it is appropriate for example to configure the control means 11, before the user sits down, so as to depressurise the device 1 and keep the device 5 at ambient pressure.

Once the user is seated in the seat 100, allowing the device 1 to return to atmospheric pressure and depressurising the device 5, the contact surfaces of the seating areas 102 and the lumbar areas 101 can be compressed against the user's body, making it possible for the device 5 to adapt to the curves imposed by the user's physique.

In this way, the control means 11 define a cushion with a shape dictated by the user and controlled and established by the device 5.

The control means 11 can also be arranged in different areas, such as the lateral areas 103 depending on the type of seat to be made.

For example, in the case of a competition seat, it is also appropriate to provide the control means 11 in the lateral areas in such a way as to allow the seat to be fully shaped based on the user's body.

In addition, the control means 11 as described, may also be present in the contact area of the user's head with the headrest 104.

Operation of the above-described support device 1 in structural terms is as follows. The device 1, and in particular the membranes 2 comprising the compressible solid bodies 3, are arranged in a seat or in a container for objects.

When not in use, the membranes 2 and the compressible solid bodies 3 are preferably in a configuration of minimum extension, so the membranes 2 are thus essentially under vacuum and the compressible solid bodies 3 are compressed. In this configuration, a passenger sits on the seat or an element is laid inside a container or other.

Air can then re-enter through the valve 2, possibly also thanks to the aid of the pump 21, which is however not necessary. The solid bodies 3 then expand as the user wishes, until they reach the configuration of maximum extension or a preferred intermediate configuration. In this configuration, for example, the user is comfortable on the seat or the object is firmly held inside the container or other. In this position, moreover, the membranes 2 maintain the shape of the compressible solid bodies 3, which can be arbitrary and of any type.

In a subsequent period, the pump 21 can again extract air from the membranes 2, compress the solid bodies 3 and arrange them in a configuration of minimum extension, or in a configuration of lesser extension.

In addition, the device 1 can carry out its own operations with the addition of the above-described elements. For example, the direction of deformation can be controlled by means of the support portion 4. Alternatively, the device 1 can be coupled to the vacuum device 5 in such a way as to create control means 11.

These configurations of the device 1 can also be used inside seats 100 of various types and according to different settings and provisions.

The support device 1 according to the invention achieves important benefits.

Even though it has a function similar to known bladders, the device 1, in a configuration of maximum extension, can be of a preferred and arbitrary shape and not necessarily roundish like the known bladders.

In addition, the support device 1 retains a shape similar to that of maximum extension even when only partially extended, thus it operates perfectly even in such configurations.

The invention is subject to variations falling within the scope of the inventive concept as defined by the claims.

In this context all the details are replaceable by equivalent elements and the materials, shapes and dimensions can be any.

The invention claimed is:

1. A support device, comprising:
 a flexible air-tight membrane defining an internal volume and comprising a connection valve configured to allow, on command, introduction or extraction of air into/from said internal volume,
 a compressible solid body housed in said internal volume and made of a material which, when said membrane is placed under vacuum, has a volume that decreases by at least 5%,
 wherein said compressible solid body is exclusively used at volumes equal to or less than the volume of said compressible solid body at ambient pressure,
 wherein said device comprises a substantially rigid support portion which is firmly attached to part of said compressible solid body, and
 wherein said support portion is breathable.

2. The support device according to claim 1, wherein when said membrane is placed under a vacuum said material has a volume that decreases by at least 50%.

3. The support device according to claim 1, wherein said support device comprises a vacuum pump and there is no means for introducing pressurized or forced air into said compressible solid body.

4. A method for using a support device, comprising:
 arranging said support device on a seat, said support device comprising
 a flexible air-tight membrane defining an internal volume and comprising a connection valve configured to allow, on command, introduction or extraction of air into/from said internal volume,
 a compressible solid body housed in said internal volume and made of a material which, when said membrane is placed under vacuum, has a volume that decreases by at least 5%, wherein said compressible solid body is exclusively used at volumes equal to or less than the volume of said compressible solid body at ambient pressure, wherein said device comprises a substantially rigid support portion which is firmly attached to part of said compressible solid body, and wherein said support portion is breathable.

5. The method according to claim 4, wherein said material comprises a polymer foam.

6. The method according to claim 5, wherein said material comprises a polyurethane foam.

7. The method according to claim 5, wherein said material comprises an open-cell polymer foam.

8. The method according to claim 4, wherein when said membrane is placed under a vacuum said material has a volume that decreases by at least 50%.

9. The method according to claim 1, wherein the air-tight membrane is glued to the outer surface of said compressible solid body.

10. The method according to claim 4, wherein a plurality of said support devices are used which are arranged substantially in series in such a way as to permit fan-opening and form means of movement.

11. The method according to claim 10, wherein said means of movement are used in the area of the headrest of a seat in such a way that a substantially hinged configuration of said headrest is achieved.

12. The method according to claim 4, wherein said support device is associated with at least one vacuum device comprising:

a main casing impermeable to the passage of fluid, flexible and defining a main volume;

an internal casing arranged inside said main casing, permeable to the passage of gas and flexible; filling particles housed within the internal casing;

a depressurisation valve configured to establish or terminate a fluid passage connection between said main volume and the external environment of said main volume and suitable to depressurise said main volume by defining a decompressed configuration wherein said filling particles are movable within said internal casing; and a compressed configuration in which said filling particles are compacted and essentially define at least one solid body.

13. The method according to claim 12, wherein the vacuum device is positioned on the external surface of the said support device.

14. The method according to claim 4, wherein said support device is positioned in the lateral areas of the seating area of said seat.

15. The method according to claim 4, wherein said support device comprises a vacuum pump and there is no means for introducing pressurized or forced air into said compressible solid body.

16. The method according to claim 6, wherein said material comprises an open-cell polymer foam.

17. The method according to claim 15, wherein when said membrane is placed under a vacuum said material has a volume that decreases by at least 50%.

18. The method according to claim 17, wherein the air-tight membrane is glued to the outer surface of said compressible solid body.

19. The method according to claim 18, wherein said device comprises a substantially rigid support portion which is firmly attached to part of said compressible solid body.

* * * * *